Dec. 22, 1959 W. MAYER 2,918,540
ENCLOSED ELECTRIFIED TRACK AND CURRENT COLLECTOR
Filed May 14, 1954 4 Sheets-Sheet 1

INVENTOR
WILBUR MAYER
BY
HIS ATTORNEY

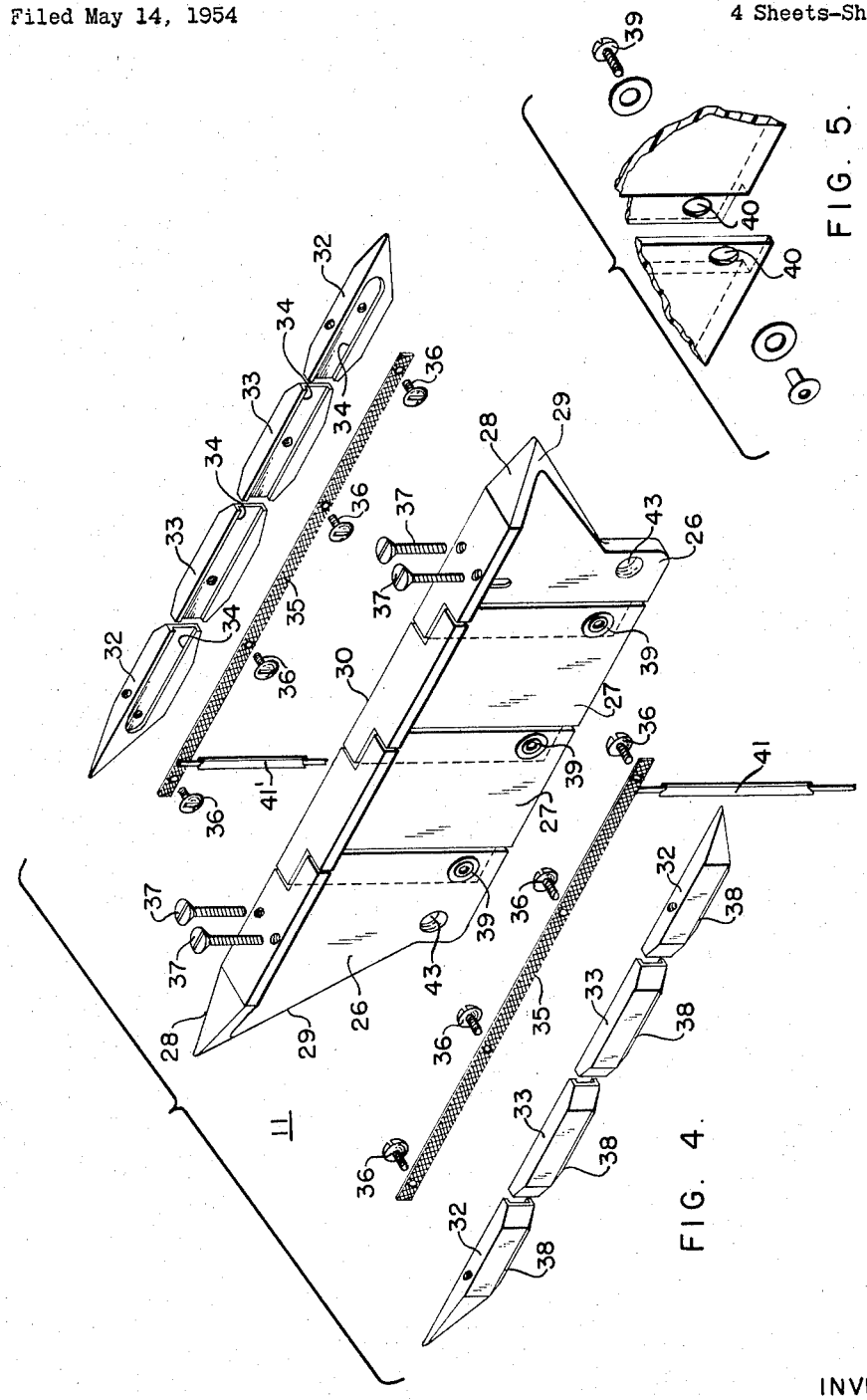

Dec. 22, 1959 W. MAYER 2,918,540
ENCLOSED ELECTRIFIED TRACK AND CURRENT COLLECTOR
Filed May 14, 1954 4 Sheets-Sheet 3

INVENTOR
WILBUR MAYER
BY
HIS ATTORNEY

Dec. 22, 1959   W. MAYER   2,918,540
ENCLOSED ELECTRIFIED TRACK AND CURRENT COLLECTOR
Filed May 14, 1954   4 Sheets-Sheet 4

INVENTOR
WILBUR MAYER
BY *Dillon S. Turney*
HIS ATTORNEY

United States Patent Office 2,918,540
Patented Dec. 22, 1959

2,918,540

ENCLOSED ELECTRIFIED TRACK AND CURRENT COLLECTOR

Wilbur Mayer, Fairfield, Iowa, assignor to The Louden Machinery Company, Fairfield, Iowa, a corporation of Iowa Application May 14, 1954, Serial No. 429,827

3 Claims. (Cl. 191—23)

My invention relates in general to electric trolley systems, and more particularly to an electrified enclosed current conducting track and an articulated current collector for use therewith.

In the design of overhead conveyor systems and other forms of electrical apparatus where it is necessary to take power from a continuous track by means of a travelling collector, such as are commonly used in electric conveyors, travelling cranes and hoists, a wide variety of constructions have been known and tried. However, certain disadvantages and inherent faults have persisted in spite of numerous attempts to solve these problems. It has been difficult to devise a track construction that is easily and economically manufactured, simple to erect, and which is effectively enclosed so that the current carrying parts are not a hazard to personnel working around the electrified track. Another serious disadvantage has been the difficulty in designing a track and current collector which will permit track joints, curves and sharp bends in the track to be easily negotiated by the collector without derailment, loss of contact and excessive arcing at such points, and without binding or sticking of the collector as it passes through such curves and joints in the track. Furthermore, the design of a track system, which permits switching from one track to another, has been difficult as the switches are a prime source of derailments and current interruptions.

The arrangement that forms the subject matter of this invention incorporates a number of novel features, including a two-part preformed track which is easily and cheaply manufactured and quickly erected to fit any desired installation irrespective of configuration, length or curvature and in which the electrified track sections are substantially totally enclosed and insulated, thereby providing a maximum of safety for personnel working around the installation. Cooperating with, and supported within, the track is a novel form of articulated current collector which, due to its construction, easily negotiates track section joints, switches, curves and irregularities in alignment of the track without any binding or sticking at such points. The design of the system is such that derailment of the collector is impossible under normal operation and when passing through section joints and in switching from one track to another. The current collecting shoes incorporated in the collector are floating and articulated, and are positioned thereon so that a plurality of contacts is made with the track at all times, thereby insuring continuous current pickup and minimum arcing. In addition, the angular position of the contact faces is such that a wiping or cleaning action is present during operation, thereby maintaining the track and collector shoe surfaces bright and clean and minimizing arcing or sparking when carrying heavy load currents.

It is, therefore, an object of this invention to provide an improved enclosed trolley electrification system for conveyors, cranes and the like.

It is further an object of this invention to provide an externally insulated continuous electrified track which is easily and economically manufactured and which lends itself to installation and erection in any situation where curvatures and straight runs are necessary.

It is a further object of this invention to provide a current collecting arrangement in which derailment of the collector from the supporting track is virtually impossible during operation irrespective of track joints, curves or switching changes from one track to another.

It is another object of this invention to provide an enclosed current carrying track which may be used for transmission of direct current or alternating current of one, two or three phases, and in which the current conducting surfaces are maintained in clean condition by the wiping action of the current collecting shoes.

It is another object of this invention to provide an articulated current collector which cooperates with an enclosed current carrying track and which carries a plurality of floating contact shoes arranged to maintain electrical contact at all times irrespective of track joints, curvature and other irregularities in the track installation.

It is still another object of this invention to provide a flexible jointed current collector which is supported by and travels inside of an enclosed electrified track, which collector is jointed in a plurality of places and capable of universal movement so that it closely and continuously follows the current carrying track in which it is supported.

Other objects and advantages will be apparent from a description of the subject invention, and the invention will be better understood from the following detailed description thereof taken in connection with the accompanying drawings and its scope will be pointed out in the appended claims.

In the drawing,

Figure 4 is an exploded perspective view of the current collector showing in detail the assembly and construction thereof.

Figure 5 is an exploded detail in perspective of an end portion of the current collector shown in Figure 4 and showing the method of articulation of the end segments of said collector.

Figure 1:
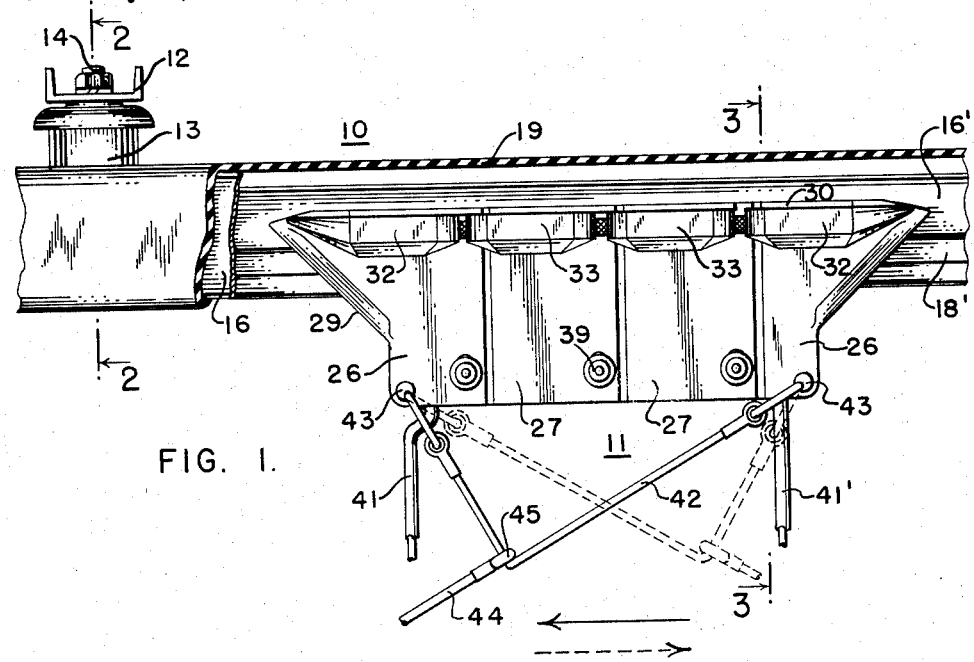
Figure 1 shows an elevation view, partially in section, of the enclosed current carrying track with the articulated current collector in place in the track.
Figure 2:
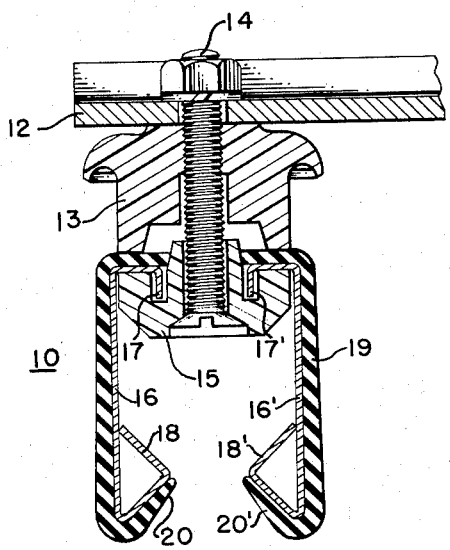
Figure 2 is a sectional view taken along the line 2—2 of Figure 1 showing a cross section through the track and track supporting insulator.

Referring now to Figure 1 of the drawing, I have shown a section of track indicated generally at 10 in which the articulated current carrying collector 11 is supported for longitudinal movement inside of the track. The track is supported at spaced intervals as necessary by means of the bracket 12, the insulating spacer 13 and clamping bolt 14. As shown in Figure 2, positioned against the upper inner surface of the track is a second insulating spacer 15 which is drawn tightly against the upper insulator 13 and support 12 by means of the threaded bolt 14.

The track itself consists of two identically formed rails or sections 16 and 16' which are preferably formed of sheet metal and provided at their upper edges with the inwardly and downwardly turned flanges 17 and 17', and at their lower edges with the reentrant triangularly shaped cross sections 18 and 18' respectively. Thus, it will be seen from Figure 2 that when the current carrying track sections or rails 16 and 16' are clamped by the bolt 14 and insulator 15, they are maintained in rigid spaced relationship and the inner angular surfaces 18 and 18' of the track sides form the current conducting surface from which current is collected by means of the movable collector 11. In order to remove the hazard of contact with the current carrying track sections 16 and 16', a preformed shield or sheath of insulating material 19, such as rubber or plastic, extends around the outer periphery of the track assembly and fits snugly to the assembly, the reentrant portions 20 and 20' extending upwardly into the open throat of the assembled track. Thus a complete protective covering surrounds the track thereby making it extremely difficult for personnel to come in contact with live current carrying parts, or for metallic objects to accidentally contact the track causing short circuits.

Figure 7:
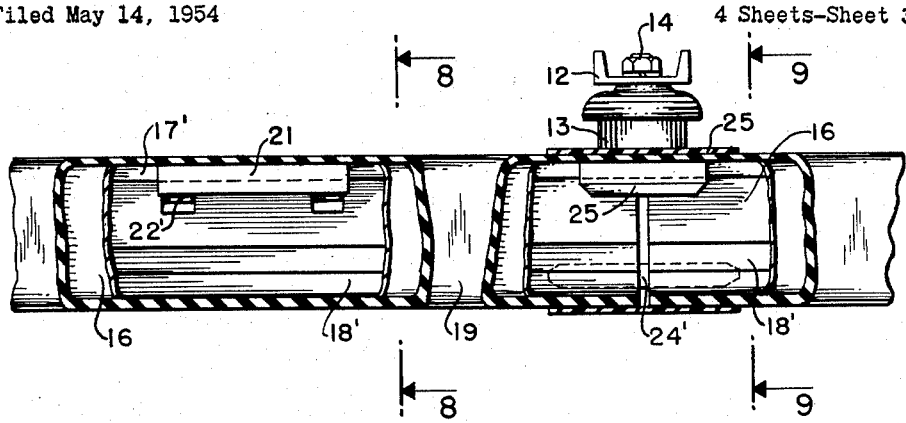
Figure 7 is an elevation view, partially in section, of a portion of the enclosed electrified track.
Figure 8:
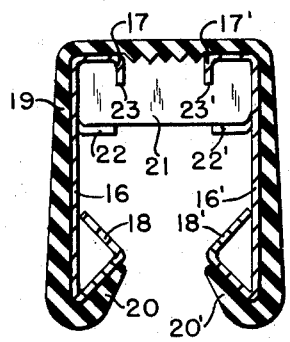
Figure 8 is a sectional view taken along the line 8—8 of Figure 7 showing a preferred form of track spacer.

In continuing the description of the track 10 and its assembly, reference should be had to Figures 7 and 8 and it will be noted that the track sides 16 and 16' are provided with insulating block spacers 21 at points intermediate the track supports 12. Figure 8 shows a cross section of track illustrating the insulating spacer 21 in position, and the ease of installation will be apparent when it is noticed that the spacer 21 is inserted in position as shown and the ears or tabs 22 and 22', which have previously been cut or blanked in the sheet metal sides 16 and 16' are struck up or bent in the position as shown in Figure 8. These tabs 22 and 22' then securely hold the insulating spacer 21 in the position as shown and the track sides are locked in permanent spaced relationship by means of the notches 23 and 23' which cooperate with the downturned edges 17 and 17' of the side rails 16 and 16', respectively.

Figure 9:
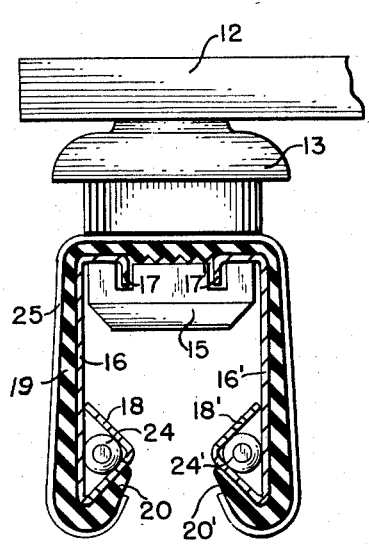
Figure 9 is a sectional view of the track taken along the line 9—9 of Figure 7 showing a detail of track at section joints.

In order to insure alignment of the track at section joints, it has been found desirable to use a pair of centering or aligning splice pins 24 and 24' as shown in Figure 9. These pins may be of any suitable current carrying metal and are preferably provided with a knurled surface so that they may be driven into place in the end of the track section and then fitted into the adjoining track section at the time the track is installed. This drive fit insures rigid mechanical construction and good electrical current transmission at the joints. In order to provide additional insulation and protection at track section joints, an additional insulating sheath 25, as shown in Figure 9, may be added around the joint thereby completely covering the ends of the track sections and completely shielding the track at all portions of its length.

For a description of the current collector designed to cooperate with the enclosed track just described, reference should now be made to Figure 4 in which an exploded perspective view of the articulated collector is shown. The collector 11 comprises a plurality of insulating segments which obviously can be of any desired number depending on the amount of current required to be transmitted and the degree of flexibility required on account of curvature of the track. In the embodiment shown, the collector 11 consists of a pair of pointed or tapered end sections 26 and a pair of intermediate sections 27. It will be noted that the end sections 26 are identical and are bevelled in a transverse direction to a point along their leading edge 28 and also bevelled in a vertical direction along the leading edge 29, thereby enabling the end section 26 to guide the collector 11 through the track. Since the end sections 26 are identical, the collector is thus able to operate in either direction in the track.

It will be noted that each of the segments 26 and 27 is of T-shaped cross section having a head portion 30 extending each side of the center line, the under surface of said head portion 30 serving as a bearing surface for the metallic current collecting shoes 32 and 33.

Figure 3:
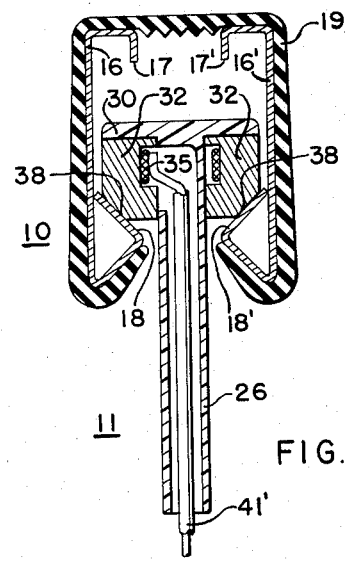
Figure 3 is a sectional view taken along the line 3—3 of Figure 1 showing a cross section of the current collector positioned in the track.

The current collecting shoes 32 and 33 are preferably formed of copper, an alloy thereof, or other suitable current collecting material, and each current collector shoe is provided with a channel or inset 34 on its inner side into which is fitted a flexible conducting braid 35. The shoes are secured to the braid 35 by means of the screws 36, all as shown in Figure 4. The end shoes 32 which are tapered to conform to the end segments 26, are bolted to the end segments 26 by tap screws 37 which extend downwardly through the head portion 30 of the segments and into the upper surface of the shoes 32. Thus only the end collecting shoes 32 are rigidly attached to the end collector segments 26, and the intermediate shoes 33 are floating, being supported only by the flexible metallic braid 35. This construction insures that at all times at least a number of the multiple collecting shoes will be in contact with the conducting surface of the track and arcing and current interruptions will be eliminated. The actual electrical contact between the track 10 and collector 11 is made by the bevelled surface 38 which forms the lower outer edge of each of the collector shoes 32 and 33. The position of the collector segments and the current collecting action will be clearly understood from reference to Figure 3 which shows the bevelled edges 38 of the collector shoes in contact with the angled inner surfaces 18 and 18' of the track side rails. In the drawing this is shown to be approximately a 45 degree angle with respect to the vertical. However, it should be understood that other similar angles may be used and it will be apparent that this construction insures that the end segments 26 and the intermediate segments 27 are forced inwardly and away from the side rails 16 and 16', thereby contributing to the free movement of the collector through the track.

Articulation and flexibility of the collector is obtained by the use of the multiple segments 26 and 27 which are loosely connected at their lower edges as seen in Figures 4 and 5 by means of screws or rivets 39, which extend through the elliptical matching holes 40 in the lower corners of the insulating segments 26 and 27. Thus a limited amount of vertical movement of one segment with respect to another is permitted as well as angular deviation of individual segments from the longitudinal center line of the collector is possible. This construction results in an extremely flexible articulation of the collector and permits, in effect, curving or bending of the collector assembly so that it will satisfactorily negotiate curvatures and misalignments in the track.

The power current which is picked up by means of the collector shoes 32 and 33 is conducted to the conveyor, hoist or other apparatus the collector is to be used with, by means of the electrical lead wires 41 and 41'. Thus in Figure 3 it will be noted that the conductor 41' is connected to the left-hand set of collector shoes by means of the braid 35, which, in turn, pick up current from the track section 16 and its inclined surface 18, whereas the conductor 41 extends downwardly through the end segment 26 and its associated collector shoes pick up power from the opposite track section 16' and its inclined contact surface 18'. This arrangement, using two current carrying rails, is suitable for direct current or single-phase alternating current, and by using the grounded load supporting run-way or track for the crane (not shown) for a third circuit, it is possible to transmit two or three phase alternating current with the same construction as previously described.

From experience, it has been found that it is desirable to pull or draw the collector 11 along the track by means of a flexible yoke or loop 42, as seen in Figure 1, which is formed of flexible material and is connected at each end to apertures 43 at the lower corner of each end segment 26. The towing cord 44 is equipped with an eye 45 at the end through which the loop 42 passes, and this arrangement permits the collector to be operated in either direction, as shown by dotted lines, and directional arrows, in Figure 1 without any changes being required. This arrangement applies most of the towing force to the rear end of the collector 11 with respect to its direction of movement and, at the same time, imposes a lesser downward force on the forward end of the collector thereby maintaining both ends of the collector in contact with the track and insuring that the articulaed collector will follow the track throughout curvatures, switches and section joints in the track.

Figure 6:
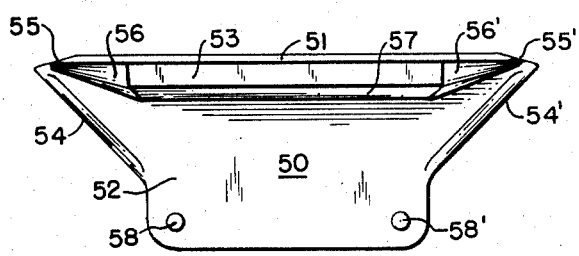
Figure 6 is a side elevation view of an alternate form of current collector according to this invention.

Figure 6 shows an alternate or modified form of a current collector designed for use with the track forming a part of this invention and may be successfully used where the track installation has no relatively sharp curvatures or short radii. In the alternate form as shown in Figure 6, the articulated or jointed segment feature of the collector has been dispensed with and an integral one-piece collector body 50 is utilized. The body 50 is formed in a T shaped cross section having a head portion 51 and a vertical body portion 52. A current collecting contact shoe 53 is disposed on each side of the upright portion 52 and lies immediately underneath the head portion 51 of the main body member. As in the case of the articulated or jointed current collector previously described, each end of the collector body 50 is provided with an upwardly tapered leading edge 54 and 54' and these leading edges are bevelled inwardly to a point in the same manner as shown with the articulated collector. The head portion 51 is also bevelled or tapered to a point at each end, as shown at 55 and 55'. The contact shoe 53 is also provided with a tapered surface at each end 56 and 56' and the lower outermost edge 57 of the collector shoe 53 is bevelled to approximately the same angle as that provided by the conducting surfaces 18 and 18' of the current carrying track. Thus, in all respects, the modified form of collector as just described in connection with Figure 6 operates in an identical manner to the articulated collector 11, however, it is much simpler and less expensive to manufacture and will give equally good results where the curvature of the track is such that a one-piece rigid collector as shown will negotiate the turns and switches. The collector shown in Figure 6 is provided with apertures 58 and 58' at each end of its lower edge so that any desired type of towing harness or attaching loop may be secured to either or both ends of the collector. The electrical current may be taken from the current collecting shoes 53 by any convenient pair of lead wires (not shown) in a manner similar to that shown in Figure 4.

Figure 10:
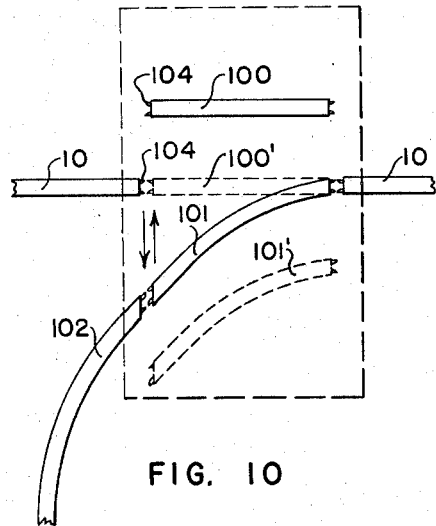
Figure 10 is a schematic plan view of a track switch of the slide type.
Figure 11:
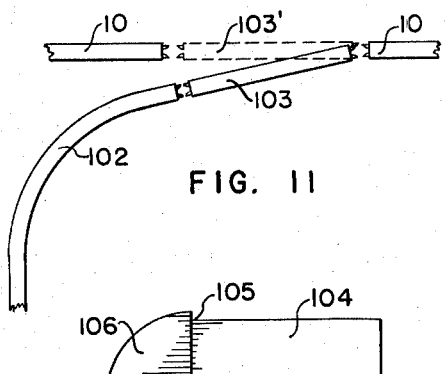
Figure 11 is a schematic plan view of a track switch of the tongue type, both views showing alternate switch positions in dotted outline.

Figures 10 and 11 of the drawings show schematically two types of switches commonly used when a track switching operation is required. In these views, only the current carrying track 10 is shown as viewed from above, the load carrying track not being shown since it would be more or less conventional, and forms no part of this invention.

In Figure 10, I have shown a "slide" type of switch which comprises the movable track sections 100 and 101 which are mechanically interconnected and move as a unit along with the load carrying track (not shown), the entire unit forming a slide switch as illustrated by the dotted rectangle. Any convenient arrangement of mechanical slides or guides may be used to accomplish this action. The alternate position of the slide switch is shown in dotted lines at 100' and 101' respectively. From this drawing, it will be apparent that in the solid line position as shown, the main track 10 is connected to the switch track 102 by means of the sliding segment 101 which is now in alignment therewith. In the dotted line position of the switch, it will be noted that the main track 10 is now connected straight through by means of the switch segment 100, with the main track again at the opposite side of the switch.

Figure 11 shows an alternate arrangement sometimes referred to as a "tongue" switch in which a section of track 103 is pivoted at one end as shown and swings between one switching position as shown by solid lines, and the alternate position as shown by dotted lines 103', the current collector passing through the switch in the same manner in either case.

Figure 14:
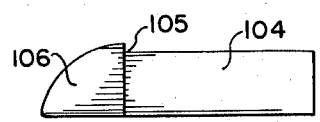
Figure 14 is an elevation view of one of the guide points as used with the track at switch points and track ends.
Figure 12:
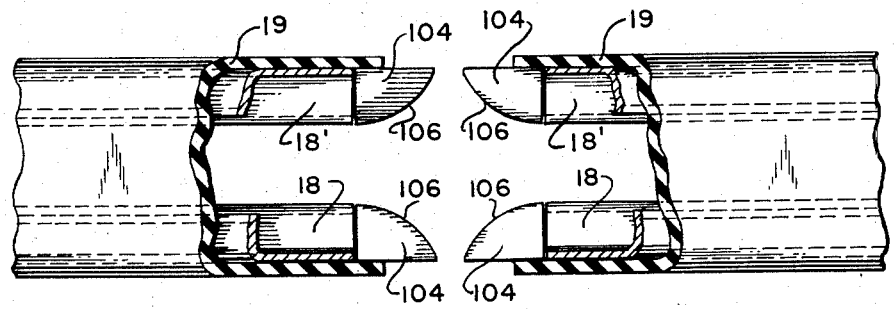
Figures 12 and 13 are top and side views respectively in enlarged detail of the adjacent ends of the current carrying track at the switch points as seen in Figures 10 and 11.
Figure 13:
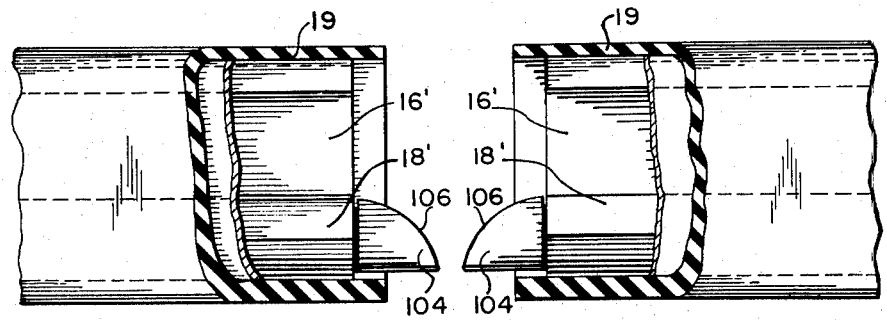

In order to guide the current collector 11 across the swich points and avoid any possibility of derailment due to misalignment of the movable part of the switch, I have shown at Figures 12 and 13, a top view and side view respectively, in detail, of one of the switch points which were generally shown in Figures 10 and 11. It will be noted that a tapered insulating plug or guide piece 104 is inserted in the triangular shaped sections 18 and 18' formed at the lower edge of each track side 16 and 16'. An enlarged elevation view of the guide point 104 is shown in Figure 14. This point 104 is preferably made of a hard, durable insulating material and is formed with a shoulder 105 which rests against the end of the track and maintains it tightly in position. A rounded taper 106 is provided on the outer open end of the switch guide point, this tapered surface forming a smooth guiding plane which in operation will cooperate with the tapered leading edge 28 and 29 of the current collector 11 to insure that the collector is guided into the next section of track as it passes through the track switch.

From examination of the switch point as shown in Figure 12 and Figure 13, it will be apparent that the tapered surface 106 extends in two dimensions and thus acts to guide the collector laterally, as can be seen in Figure 12, as well as to raise the leading end of the collector 11 in the event of vertical misalignment at the switch, as will be apparent in Figure 13. This construction as previously described may be used with either type of switch as shown in Figures 10 and 11 and has been found most effective in preventing derailment or binding of the collector 11 at switch points even though considerable misalignment of the switch may exist. The same desirable result is obtained when the alternate form of rigid collector 50, as shown in Figure 6 is used.

The drawings have illustrated a preferred form of the collector in which two intermediate segments 27 are flexibly joined between the two leading segments 26. However, this is illustrative only and it will be obvious that a greater or lesser number of articulated segments and a corresponding number of collector shoes may be utilized depending upon the amount of current necessary to be transmitted and to a lesser degree, upon the amount of curvature in the track 10. As pointed out previously, a rigid one piece collector, as described in connection with Figure 6, can be successfully used in many applications. The track construction provides a simple and easily erected track structure since the track itself may be prefabricated in the factory in sections of any convenient length for shipping and handling; for example, ten-foot sections, and erected in the field on supports 12 which have previously been placed. The insulating spacers 21 may be spaced as frequently as desired to insure rigid alignment of the track, and one track section is easily connected to the adjoining section by means of the splice pins 24 and 24', as previously described.

It is also apparent that the current carrying track, when used with this articulated current collector with its flexible towing connection, does not require accurate spacing from the actual load carrying conveyor or crane track since considerable latitude in transverse spacing is permissible. It has also been found that the sliding and wiping action of the bevelled contact shoe faces 38 as they pass along the corresponding inclined current carrying surfaces 18 and 18' of the track, results in both surfaces being maintained clean and free of dirt or corrosion. At the same time, the weight of the collector assembly plus the downward pull exerted by the tow cord 44 is not sufficient to cause undue wearing of these current transferring surfaces.

In summarizing, it should be emphasized that the chief advantage of this system is its reliability and freedom from derailment. Due to the enclosing nature of the track, it is virtually impossible to force the collector out of the track, and the collector construction, with its tapered leading edge and self-centering features, prevents binding, freezing or jamming within the track even when substantial misalignment of the track at section joints or switch points occurs.

While I have shown and described a particular embodiment of my invention, it will be apparent to those skilled in the art that certain changes and modifications may be made therein without departing from my invention in its broader aspects and I, therefore, aim in the appended claims to cover any such modifications as may be made without departing from the true spirit and scope of this invention.

What I claim as new and desire to secure by Letters Patent of the United States is:

1. A current carrying track assembly comprising a pair of electrically conducting side rails, each side rail being substantially of channel cross-section having an inwardly and downwardly turned continuous upper flange and an inwardly and upwardly angularly disposed continuous lower flange, an insulating spacer provided with a pair of parallel grooves in the upper surface thereof for engaging said upper flanges and maintaining said rails in parallel spaced relationship, spacer securing tabs bent inwardly from each of said side rails and bearing against the undersurface of said insulated spacer for maintaining said spacer rigidly against said upper flange, and an insulating shield extending around said track assembly and enclosing said assembly on three sides thereof.

2. A current carrying track assembly comprising a pair of electrically conducting side rails, each side rail being substantially of channel cross-section having an inwardly and downwardly turned continuous upper flange and an inwardly and upwardly angularly disposed continuous lower flange, a first insulating member provided with a pair of parallel grooves in the upper surface thereof for engaging said upper flanges and maintaining said rails in parallel spaced relationship, a second insulating member positioned above said first insulating member, and clamping means extending through said first and said second insulating members for drawing said members together and locking said upper flanges securely therebetween.

3. A current carrying track assembly according to claim 2, including insulating means externally surrounding said track assembly on both sides and the top thereof.

References Cited in the file of this patent

UNITED STATES PATENTS

| | | |
|---|---|---|
| 539,418 | Cotton | May 21, 1895 |
| 588,890 | Wetmore | Aug. 24, 1897 |
| 1,152,489 | Cowen | Sept. 7, 1915 |
| 1,590,569 | Fisk | June 29, 1926 |
| 2,025,813 | Frank | Dec. 31, 1935 |
| 2,064,199 | Elder | Dec. 15, 1936 |
| 2,131,884 | Brodhecker | Oct. 4, 1938 |
| 2,132,022 | Frank et al. | Oct. 4, 1938 |
| 2,495,197 | McMullen | Jan. 17, 1950 |
| 2,626,298 | Hammerly | Jan. 20, 1953 |
| 2,626,301 | Hammerly | Jan. 20, 1953 |
| 2,700,706 | Frank | Jan. 25, 1955 |
| 2,728,819 | Hauss | Dec. 27, 1955 |

FOREIGN PATENTS

| | | |
|---|---|---|
| 524,537 | Canada | May 1, 1956 |
| 873,396 | Germany | Apr. 13, 1953 |
| 4,162 of 1882 | Great Britain | Aug. 31, 1882 |